UNITED STATES PATENT OFFICE.

THEODOR KEMPF, OF BERLIN, GERMANY, ASSIGNOR TO THE CHEMISCHE FABRIK AUF ACTIEN, OF SAME PLACE.

PROCESS OF MANUFACTURING PERMANGANATES.

SPECIFICATION forming part of Letters Patent No. 326,657, dated September 22, 1885.

Application filed June 10, 1-84. (No specimens.) Patented in Germany March 7, 1884, No. 28,782; in England May 26, 1884, No. 8,218; in Belgium May 26, 1884, No. 65,267; in France May 26, 1884, No. 162,357; in Luxemburg May 27, 1884, No. 407; in Italy June 17, 1884, XXXIII. 395, and in Austria-Hungary November 26, 1884, Nr. 35,078 and No. 53,933.

*To all whom it may concern:*

Be it known that I, THEODOR KEMPF, doctor of philosophy, a subject of the King of Prussia, residing at Berlin, Prussia, German Empire, have invented certain new and useful Improvements in Processes of Manufacturing Permanganates; and I do hereby declare the following to be a full, clear, and exact description of the invention, such as will enable others skilled in the art to which it appertains to make and use the same.

The present invention relates to the conversion of manganic acid salts into permanganic-acid salts by means of the electric current. To this end I preferably arrange the electrodes in separate cells or divisions of a vessel, formed by the interposition of porous walls, the negative electrode being suspended in water and the positive electrode in the solution of manganic-acid salt. The action of the electric current passing through the cells results in the precipitation of the permanganic acid in the cell of the positive electrode, while the hydroxide of the metal presents itself under development of hydrogen in the cell containing the negative electrode. The same conversion of manganic-acid salts into permanganic-acid salts takes place if both electrodes are suspended in the solution of the manganic-acid salt, but the metallic hydroxide is then not obtained separately.

The process may be explained by the following formula, M indicating the metal of the salt: $M_2MnO_4 + H_2O = MMnO_4 + MOH + H$. Thus, for instance, if manganate of potash is employed and the electrodes arranged in separate cells, as above described, permanganate of potash is formed in the cell containing the positive electrode, the hydroxide of potassium presenting itself under development of hydrogen at the negative electrode in the adjacent cell. If separate cells or divisions are employed, these may be arranged in any desired manner, since it is only necessary to interpose between the cells a porous partition.

Having now described my invention, what I claim is—

The process of commercially producing permanganic-acid salts and obtaining free metallic hydroxides by electrolytically treating the solutions of the manganic-acid salts, substantially as set forth.

In testimony whereof I affix my signature in presence of two witnesses.

THEODOR KEMPF.

Witnesses:
A. DEMELIUS,
B. ROI.